US008843525B2

(12) United States Patent
Roh et al.

(10) Patent No.: US 8,843,525 B2
(45) Date of Patent: Sep. 23, 2014

(54) APPARATUS AND METHOD FOR CALCULATING THE SELECTIVITY OF A RANGE QUERY FOR MULTIDIMENSIONAL DATA

(75) Inventors: Yohan J. Roh, Yongin-si (KR); Myoung Ho Kim, Daejeon-si (KR); Jaeho Kim, Daejeon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 384 days.

(21) Appl. No.: 13/222,754

(22) Filed: Aug. 31, 2011

(65) Prior Publication Data

US 2012/0317092 A1 Dec. 13, 2012

(30) Foreign Application Priority Data

Jun. 7, 2011 (KR) ........................ 10-2011-0054744

(51) Int. Cl.
*G06F 7/00* (2006.01)
*G06F 17/30* (2006.01)
(52) U.S. Cl.
CPC .... *G06F 17/30592* (2013.01); *G06F 17/30469* (2013.01)
USPC ............................ 707/797; 707/793; 707/798
(58) Field of Classification Search
None
See application file for complete search history.

(56) References Cited

U.S. PATENT DOCUMENTS

| 5,781,906 | A | * | 7/1998 | Aggarwal et al. ................ | 1/1 |
|---|---|---|---|---|---|
| 5,987,468 | A | * | 11/1999 | Singh et al. ................ | 1/1 |
| 6,003,029 | A | * | 12/1999 | Agrawal et al. ................ | 1/1 |
| 6,137,493 | A | * | 10/2000 | Kamimura et al. ............ | 345/423 |
| 6,154,746 | A | * | 11/2000 | Berchtold et al. ................ | 1/1 |
| 6,311,181 | B1 | * | 10/2001 | Lee et al. ................ | 1/1 |
| 6,507,840 | B1 | * | 1/2003 | Ioannidis et al. ................ | 1/1 |
| 7,188,097 | B2 | * | 3/2007 | Na et al. ................ | 707/737 |
| 7,840,353 | B2 | * | 11/2010 | Ouksel et al. ................ | 701/300 |
| 8,452,088 | B1 | * | 5/2013 | De Ponti et al. ............... | 382/165 |
| 2004/0010488 | A1 | * | 1/2004 | Chaudhuri et al. ............... | 707/3 |
| 2011/0145244 | A1 | | 6/2011 | Kim et al. | |

FOREIGN PATENT DOCUMENTS

| JP | 3598183 | 9/2004 |
|---|---|---|
| KR | 10-0233365 | 9/1999 |
| KR | 10-2003-0013619 | 2/2003 |
| KR | 10-2008-0010202 | 1/2008 |
| KR | 10-2011-0067781 | 6/2011 |

OTHER PUBLICATIONS

Roh et al. (Yohan J. Roh et al. "Hierarchically Organized Skew-Tolerant Histograms for Geographic Data Objects," ACM, SIGMOD'10, Jun. 6, 2010, pp. 627-638).*

(Continued)

*Primary Examiner* — Robert Beausoliel, Jr.
*Assistant Examiner* — Hexing Liu
(74) *Attorney, Agent, or Firm* — NBIP Law (57) ABSTRACT

An apparatus and method for calculating the selectivity of a range query for multidimensional data using a multidimensional histogram are provided. A data space may be partitioned into one or more sub-spaces based on a sum of skew values of the one or more sub-spaces, a space-partitioning tree may be generated for the data space, and a multidimensional histogram may be generated for the data space based on the space-partitioning tree. A range query for multidimensional data may be processed based on the multidimensional histogram.

18 Claims, 6 Drawing Sheets

(56) References Cited

OTHER PUBLICATIONS

Gunopulos (Dimitrios Gunopulos et al., "Selectivity estimators for multidimensional range queries over real attributes." The VLDB Journal 2003, pp. 1-18).*

Francesso Buccafurri et al. "A Quad-Tree Based Multiresolution Approach for Two-dimensional Summary data," DEIS Dept. University of Calabria pp. 1-13.*

Acharya et al., "Selectivity Estimation in Spatial Databases", 1999, SIGMOD '99 Philadelphia PA, pp. 13-24.*

Garofalakis Minos, "Probabilistic Wavelet Synopses", Mar. 2004, ACM Transaction on Database Systems, vol. 29, pp. 43-90.*

Kwon et al. "Skew-Resistant Parallel Processing of Feature-Extracting Scientific User-Defined Functions," Jun. 10-11, 2010, SoCC, Indianapolis, Indiana, USA.*

\* cited by examiner

<SPACE PARTITIONING>

<SPACE-PARTITIONING TREE>

FIG. 4

| COVER | NODE(S) | SKEW |
|-------|---------|------|
| $C_1$ | 13 | 34.4 |
| $C_2$ | 4, 8, 12 | 25.6 |
| $C_3$ | 4, 5, 6, 7, 12 | 20.4 |
| $C_4$ | 4, 8, 9, 10, 11 | 21.1 |
| $C_5$ | 1, 2, 3, 8, 12 | 23.7 |

APPARATUS AND METHOD FOR CALCULATING THE SELECTIVITY OF A RANGE QUERY FOR MULTIDIMENSIONAL DATA

CROSS-REFERENCE TO RELATED APPLICATION(S)

This application claims the benefit under 35 U.S.C. §119(a) of Korean Patent Application No. 10-2011-0054744, filed on Jun. 7, 2011, in the Korean Intellectual Property Office, the entire disclosure of which is incorporated herein by reference for all purposes.

BACKGROUND

1. Field

The following description relates to a database and a query processing technique thereof.

2. Description of the Related Art

Multidimensional data is data that includes two or more attributes. For example, in the field of medicine patient information for use in making a medical decision may include age information, various lab test results, prior medical history, and the like, and may be classified as multidimensional data. Multidimensional data is currently being used in various fields including the fields of medicine and also various other fields such as finance.

Multidimensional histograms are summaries of multidimensional data. Multidimensional data is generally large in size and as a result is commonly stored in disks. On the other hand, a multidimensional histogram is a summary of multidimensional data. Typically a multidimensional histogram is relatively small in size and as a result is commonly stored in memories that are more accessible than hard disks. Because of this, when processing a range query for multidimensional data or estimating the range query, it may be more efficient to generate a multidimensional histogram based on the multidimensional data and manage the multidimensional data on a memory level using the multidimensional histogram instead of using the entire multidimensional data.

A multidimensional histogram typically includes a plurality of buckets. For example, a multidimensional histogram may include several hundreds of buckets. Each bucket includes a data space S and data quantity information F that indicates an amount of data in the data space S. It may be assumed that F data in the data space S is uniformly distributed. However, data may not necessarily be uniformly distributed in each bucket.

A distribution of data in a particular data space may be arbitrary. Therefore, estimation of the selectivity of a range query may be affected by how each bucket is determined. An estimate of the selectivity of a range query is proportional to the overlapping area of the range query and each bucket. Accordingly, it is helpful to distribute data in each bucket as uniformly as possible in order to improve the precision of estimation of the selectivity of a range query.

SUMMARY

In one general aspect, there is provided an apparatus for calculating the selectivity of a range query for multidimensional data, the apparatus including a tree generation unit configured to partition a data space into one or more sub-spaces based on a sum of skew values of the one or more sub-spaces, and to generate a space-partitioning tree for the data space, and a histogram generation unit configured to generate a histogram for the data space based on the space-partitioning tree.

The tree generation unit may be further configured to receive an integer value of 3 or greater for an integer k that is tree generation information for generating the space-partitioning tree, and to partition the data space into the one or more sub-spaces using minimum skew k-ary space partitioning by which the sum of the skew values of the one or more sub-spaces is minimized.

The tree generation unit may be further configured to perform minimum skew k-ary space partitioning for each integer value that is obtained by sequentially increasing a value of the integer k for a predefined amount of time.

The skew value of each sub-space may be defined as a multiplication of a size of a corresponding sub-space and a standard deviation of a number of data in the corresponding sub-space.

The apparatus may further comprise a minimal cover acquisition unit configured to acquire a set of one or more nodes that satisfy a first set of conditions from the space-partitioning tree, as a cover, and to acquire a set of one or more nodes that satisfy a second set of conditions from the space-partitioning tree, as a minimal cover, wherein the first set of conditions are 1) the union of terminal child nodes of the set of nodes is the same as the terminal nodes of the space-partitioning tree, and 2) none of the set of nodes are in an ancestor-descendent relationship, and the second set of conditions are 1) the number of nodes that are included in the cover is the same as or less than the number of buckets in a multidimensional histogram, and 2) the cover has a minimum skew value.

The histogram generation unit may be further configured to generate the histogram based on the minimal cover.

In another aspect, there is provided an apparatus for calculating the selectivity of a range query for multidimensional data, the apparatus including a tree generation unit configured to generate a plurality of space-partitioning trees for a data space, a minimal cover acquisition unit configured to acquire a plurality of minimal covers from the plurality of space-partitioning trees, respectively, each of the plurality of minimal covers including one or more nodes of a corresponding space-partitioning tree, and to select one of the plurality of minimal covers, and a histogram generation unit configured to generate a histogram for the data space based on the selected minimal cover.

The tree generation unit may be further configured to partition the data space into one or more sub-spaces based on a sum of skew values of the one or more sub-spaces.

The tree generation unit may be further configured to receive a predetermined range of integer values for an integer k that is tree generation information for generating the plurality of space-partitioning trees, to partition the data space into one or more sub-spaces using minimum skew k-ary space partitioning by which a sum of skew values of the one or more sub-spaces is minimized, and to generate a space-partitioning for each integer value that is included in the predetermined range of integer values.

The skew value of each sub-space may be defined as a multiplication of a size of a corresponding sub-space and a standard deviation of a number of data in the corresponding sub-space.

The minimal cover acquisition unit may comprise an acquisition module configured to acquire a minimal cover for each integer value that is included in the predetermined range, from the number of space-partitioning trees, and a selection module configured to select a minimal cover that has a smallest skew value from among the minimal covers of each integer value.

The acquisition module may be further configured to acquire a set of one or more nodes that satisfy a first set of conditions from a space-partitioning tree, as a cover, and to acquire a set of one or more nodes that satisfy a second set of conditions from the space-partitioning tree, as a minimal cover, and the first set of conditions are 1) the union of terminal child nodes of the set of nodes is the same as the terminal nodes of the space-partitioning tree, and 2) none of the set of nodes are in an ancestor-descendent relationship, and the second set of conditions are 1) the number of nodes that are included in the cover is the same as or less than the number of buckets in a multidimensional histogram, and 2) the cover has a minimum skew value.

In another aspect, there is provided a method of calculating the selectivity of a range query for multidimensional data, the method including partitioning a data space into one or more sub-spaces based on a sum of skew values of the one or more sub-spaces, and generating a space-partitioning tree for the data space, and generating a histogram for the data space based on the space-partitioning tree.

The generating the space-partitioning tree may comprise receiving an integer value of 3 or greater for an integer k that is tree generation information for generating the space-partitioning tree, and partitioning the data space into the one or more sub-spaces using minimum skew k-ary space partitioning by which the sum of the skew values of the one or more sub-spaces is minimized.

The generating the space-partitioning tree may further comprise performing minimum skew k-ary space partitioning for each integer value that is obtained by sequentially increasing a value of the integer k for a predefined amount of time.

The method may further comprise acquiring a set of one or more nodes that satisfy a first set of conditions from the space-partitioning tree, as a cover, and acquiring a set of one or more nodes that satisfy a second set of conditions from the space-partitioning tree, as a minimal cover, wherein the first set of conditions are 1) the union of terminal child nodes of the set of nodes is the same as the terminal nodes of the space-partitioning tree, and 2) none of the set of nodes are in an ancestor-descendent relationship, and the second set of conditions are 1) the number of nodes that are included in the cover is the same as or less than the number of buckets in a multidimensional histogram, and 2) the cover has a minimum skew value.

In another aspect, there is provided a method of calculating the selectivity of a range query for multidimensional data, the method including generating a plurality of space-partitioning trees for a data space, acquiring a plurality of minimal covers from the plurality of space-partitioning trees, respectively, each of the plurality of minimal covers including one or more nodes of a corresponding space-partitioning tree, selecting one of the plurality of minimal covers, and generating a histogram for the data space based on the selected minimal cover.

The generating the plurality of space-partitioning trees may comprise partitioning the data space into one or more sub-spaces based on a sum of skew values of the one or more sub-spaces.

The generating the plurality of space-partitioning trees may comprise receiving a predetermined range of integer values for an integer k that is tree generation information for generating the plurality of space-partitioning trees, partitioning the data space into one or more sub-spaces using minimum skew k-ary space partitioning by which a sum of skew values of the one or more sub-spaces is minimized, and generating a space-partitioning tree for each integer value that is included in the predetermined range.

The acquiring the plurality of minimal covers may comprise acquiring a minimal cover for each integer value that is included in the predetermined range, from the number of space-partitioning trees, and selecting a minimal cover that has a smallest skew value from among the minimal covers for each integer value.

The acquiring the plurality of minimal covers may comprise acquiring a set of one or more nodes that satisfy a first set of conditions from a space-partitioning tree, as a cover, and acquiring a set of one or more nodes that satisfy a second set of conditions from the space-partitioning tree, as a minimal cover, wherein the first set of conditions are 1) the union of terminal child nodes of the set of nodes is the same as the terminal nodes of the space-partitioning tree, and 2) none of the set of nodes are in an ancestor-descendent relationship, and the second set of conditions are 1) the number of nodes that are included in the cover is the same as or less than the number of buckets in a multidimensional histogram, and 2) the cover has a minimum skew value.

In another aspect, there is provided a method of calculating the selectivity of a range query for multidimensional data, the method including receiving, from a user, an integer value or a range of integer values as a value of an integer k, partitioning a multidimensional data space into one or more sub-spaces based on the integer value or the range of integer values using minimum skew k-ary space partitioning by which a sum of skew values of the one or more sub-spaces is minimized, and generating v space-partitioning trees by mapping the one or more sub-spaces to one or more tree nodes, wherein v is equal to the number of integer values received from the user, acquiring v minimal covers from the v space-partitioning trees, respectively, and selecting a minimal cover with a smallest skew value from among the v minimal covers, as a final minimal cover, and generating a multidimensional histogram based on the final minimal cover.

In response to receiving the integer value as the value of the integer k from the user, the generating the v space-partitioning trees may comprise performing minimum skew k-ary space partitioning for each integer value that is obtained by sequentially increasing the value of the integer k for a predefined amount of time.

Other features and aspects may be apparent from the following detailed description, the drawings, and the claims.

BRIEF DESCRIPTION OF THE DRAWINGS

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
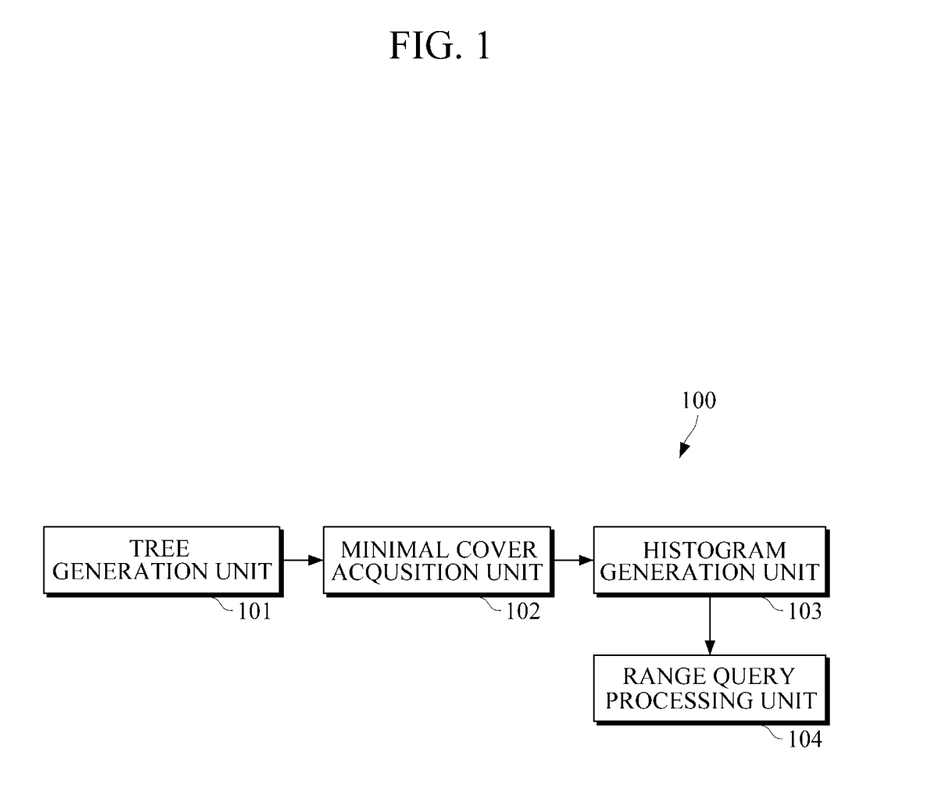
FIG. 1 is a diagram illustrating an example of an apparatus for calculating the selectivity of a range query for multidimensional data.

FIG. 1 illustrates an example of an apparatus for calculating the selectivity of a range query for multidimensional data.

Referring to FIG. 1, apparatus 100 may be applied to a system that processes and manages multidimensional data. For example, the apparatus 100 may be applied to various medical IT solutions such as a personal health record (PHR) system, a clinical decision support (CDS) system, and the like. The apparatus 100 may be included in a terminal, for example, a computer, a mobile terminal, a tablet, and the like.

The apparatus 100 may process a range query for multidimensional data based on a multidimensional histogram. The multidimensional histogram includes summary information of the multidimensional data. Due to its size, multidimensional data is typically stored in a disk, and the multidimensional histogram is typically stored in a memory that is more accessible than a disk.

In various examples herein, the apparatus 100 may efficiently manage the multidimensional data using the multidimensional histogram. For example, the apparatus 100 may generate a multidimensional histogram using a space-partitioning tree that corresponds to the multidimensional data. In the example of FIG. 1, the apparatus 100 includes a tree generation unit 101, a minimal cover acquisition unit 102, a histogram generation unit 103, and a range query processing unit 104.

The tree generation unit 101 may generate a space-partitioning tree for a multidimensional data space. The space-partitioning tree may have one or more nodes to which portions of the multidimensional data space are mapped. For example, a multidimensional data space A that is partitioned into sub-spaces B and C may be mapped to node A, and sub-spaces B and C may be mapped to nodes B and C, respectively. In this example, node A is a parent node, and nodes B and C are child nodes of node A.

The tree generation unit 101 may partition the multidimensional data space using minimum skew k-ary space partitioning. Minimum skew k-ary space partitioning is a technique of partitioning a data space repeatedly and recurrently into k sub-spaces such that a sum of skew values of sub-spaces that is obtained at each stage of partitioning of the data space is minimized. In this example, k is an integer. Each sub-space of a data space may correspond to a minimum bounding region. A minimum bounding region is a minimal region including all data that exists in a corresponding data space or a corresponding sub-space.

A skew value may be used to indicate the degree of imbalance of data that is included in each sub-space of a data space. For example, a skew value wSkew(b) of a sub-space b in data space may be calculated by multiplying a size size(b) of the sub-space b by a standard deviation sd(b) of a frequency of data objects in the sub-space b, as indicated by Equation (1):

$$w\text{Skew}(b) = \text{size}(b) \times sd(b) \tag{1}$$

In this example, the less the skew value wSkew(b), the more uniformly the data objects are determined to be distributed in the sub-space b.

The tree generation unit 101 may receive an integer value or a range of integer values that may be used as the integer k in tree generation information. For example, the tree generation unit 101 may receive the integer value or the range of integer values from a user. As another example, the tree generation unit 101 may use a default integer value and/or a default range of integer values as the integer k.

In response to only one integer value being provided as the value of the integer k, for example, k=3, the tree generation unit 101 may generate a space-partitioning tree through minimum skew k-ary space partitioning.

In a case in which only one integer value is given as the value of the integer k, the tree generation unit 101 may generate a plurality of space-partitioning trees by performing minimum skew k-ary space partitioning repeatedly within a predefined amount of time while increasing the value of the integer k from the given integer value. For example, the predefined amount of time may be set based on a predetermined number of clocks or a predetermined execution cycle. As an example, if the predefined amount of time is four clock cycles long, and a value of 3 is provided as the value of the integer k, the value of the integer k may be increased sequentially by one from the value of 3 to 7 (i.e. for four clock cycles), and four minimum skew k-ary space partitioning processes ranging from minimum skew 3-ary space partitioning to minimum skew 7-ary space partitioning may be performed (i.e. 3-ary, 4-ary, 5-ary, 6-ary, and 7-ary).

As another example, if a range of integer values is given as the value of the integer k, the tree generation unit 101 may generate a number of space-partitioning trees corresponding to a number of v integer values that are included in the given range through minimum skew k-ary space partitioning. For example, if the given range is $2 \leq k \leq 5$, the tree generation unit 101 may generate 4 space-partitioning trees.

The minimal cover acquisition unit 102 may obtain a minimal cover from one or more space-partitioning trees that are provided by the tree generation unit 101. In this example, the term 'cover' is used to indicate a set of nodes that satisfy one or more conditions. For example, the minimal cover acquisition unit 102 may select a set of nodes that satisfy the following two cover conditions from a space-partitioning tree, as a cover: 1) the union of terminal child nodes of the set of nodes is the same as the terminal nodes of the space-partitioning tree; and 2) none of the set of nodes are in an ancestor-descendent relationship. Due to cover condition 1), an area in which data exists may be entirely covered by the cover that is obtained by the minimal cover acquisition unit 102.

In this example, the term 'minimal cover' is used to indicate a cover that satisfies the following two minimal cover conditions: 1) the number of nodes that are included in the cover is the same as or less than the number of buckets included in a multidimensional histogram; and 2) the cover has a minimum skew value. In this example, the expression 'skew of a cover' is used to indicate the sum of the skew values of all nodes that are included in the cover.

For example, if only one value is given as the value of the integer k, the tree generation unit 101 may generate only one space-partitioning tree. In this example, the minimal cover acquisition unit 102 may acquire only one minimal cover from the space-partitioning tree.

As another example, in a case in which a range of integer values is given as the value of the integer k, the tree generation unit 101 may generate v space-partitioning trees where v corresponds to the number of integer values included in the range of integer values. In this example, the minimal cover acquisition unit 102 may acquire v minimal covers from the v space-partitioning trees, and may select a minimal cover as a final minimal cover. For example, the minimal acquisition unit 102 may select a minimal cover that has a minimum skew value, from among the v minimal covers, as a final minimal cover The histogram generation unit 103 may generate a multidimensional histogram based on a minimal cover that is provided by the minimal cover acquisition unit 102. For example, the histogram generation unit 103 may configure one or more nodes of a minimal cover as buckets in a multidimensional histogram.

The range query processing unit 104 may process a range query that is based on the multidimensional histogram generated by the histogram generation unit 103. For example, the range query processing unit 104 may estimate the selectivity of a range query I using Equation (2):

$$\text{Estimate of Selectivity of Range Query} = \sum_{i=1}^{n} \frac{|S_i \wedge I|}{|S_i|} \cdot F_i \quad (2)$$

where || indicates the size of a data space, A indicates intersection, $S_i$ indicates an i-th bucket of a multidimensional histogram, and $F_i$ indicates an object frequency of the i-th bucket.

As described herein, a multidimensional histogram may include a number of buckets that are obtained from one or more space-partitioning trees. The one or more space-partitioning trees may be generated via minimum skew k-ary space partitioning. Minimum skew k-ary space partitioning is a technique of partitioning space into k sub-spaces without causing data imbalance. A minimal cover that is obtained by minimum skew k-ary space partitioning may be used to configure buckets of a multidimensional histogram. Accordingly, it is possible to set buckets of the multidimensional histogram to have a uniform distribution of data and thereby improve the precision of estimation of the selectivity of a range query.

Figure 2:
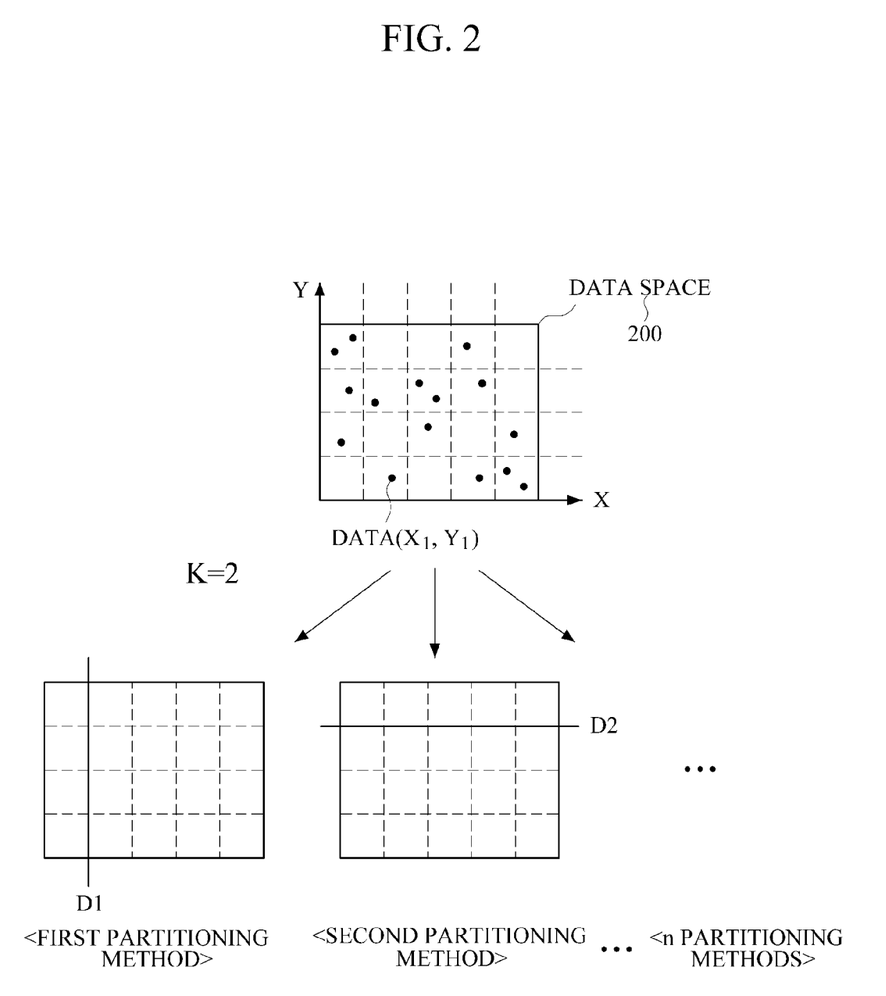
FIG. 2 is a diagram illustrating an example of minimum skew k-ary space partitioning.

FIG. 2 illustrates an example of minimum skew k-ary space partitioning.

Referring to FIG. 2, a two-dimensional (2D) data space 200 is provided as an example of multidimensional data space. Each data in the data space 200 has two different attributes. For example, the X-axis of the data space 200 may represent a first attribute (for example, age), and the Y-axis of the data space 200 may represent a second attribute (for example, blood pressure).

If a value of 2 is given as the value of the integer k, the data space 200 may be partitioned by minimum skew 2-ary space partitioning. For example, the data space 200 may be partitioned into sub-spaces A and B by a vertical dividing line D1, which is referred to as a first partitioning method. As another example, the data space 200 may be partitioned into sub-spaces C and D by a horizontal dividing line D2, which is referred to as a second partitioning method. There may be n partitioning methods to partition the data space 200. The n number of partitioning methods may be determined by the number of attributes represented by the axes of the data space 200. The tree generation unit 101 may select a partitioning method that produces a minimum sum of skew values of the sub-spaces that are obtained by partitioning the data space 200 from among the n partitioning methods. For example, the tree generation unit 101 may choose a partitioning method that produces a minimum sum of skew values of minimum bounding regions in the data space 200.

In response to sub-spaces A and B being obtained by the first partitioning method, the tree generation unit 101 may calculate a sum S1 of skew values of sub-spaces A and B. In response to sub-spaces C and D being generated by the second partitioning method, the tree generation unit may calculate a sum S2 of skew values of the sub-spaces C and D. In this example, the tree generation unit 101 may compare the sum S1 and the sum S2, and may choose one of the first and second partitioning methods based on the comparison. For example, if the sum S1 is smaller than the sum S2, the tree generation unit 101 may select the first partitioning method.

In response to the first partitioning method being selected by minimum skew k-ary space partitioning, the data space 200 may be partitioned into sub-spaces A and B. In addition, each of sub-spaces A and B may be further partitioned into two sub-spaces using a partition method that minimizes the sum of skew values of the two sub-spaces.

As a non-limiting example only, FIG. 2 illustrates partitioning the data space 200 into two sub-spaces on the assumption that k=2. As another example, the data space 200 may be partitioned into more than two sub-spaces according to the value of the integer k.

As described herein, because the data space 200 is partitioned into a plurality of sub-spaces by minimum skew k-ary space partitioning, it is possible to generate one or more sub-spaces that have data uniformly distributed therein.

Figure 3:
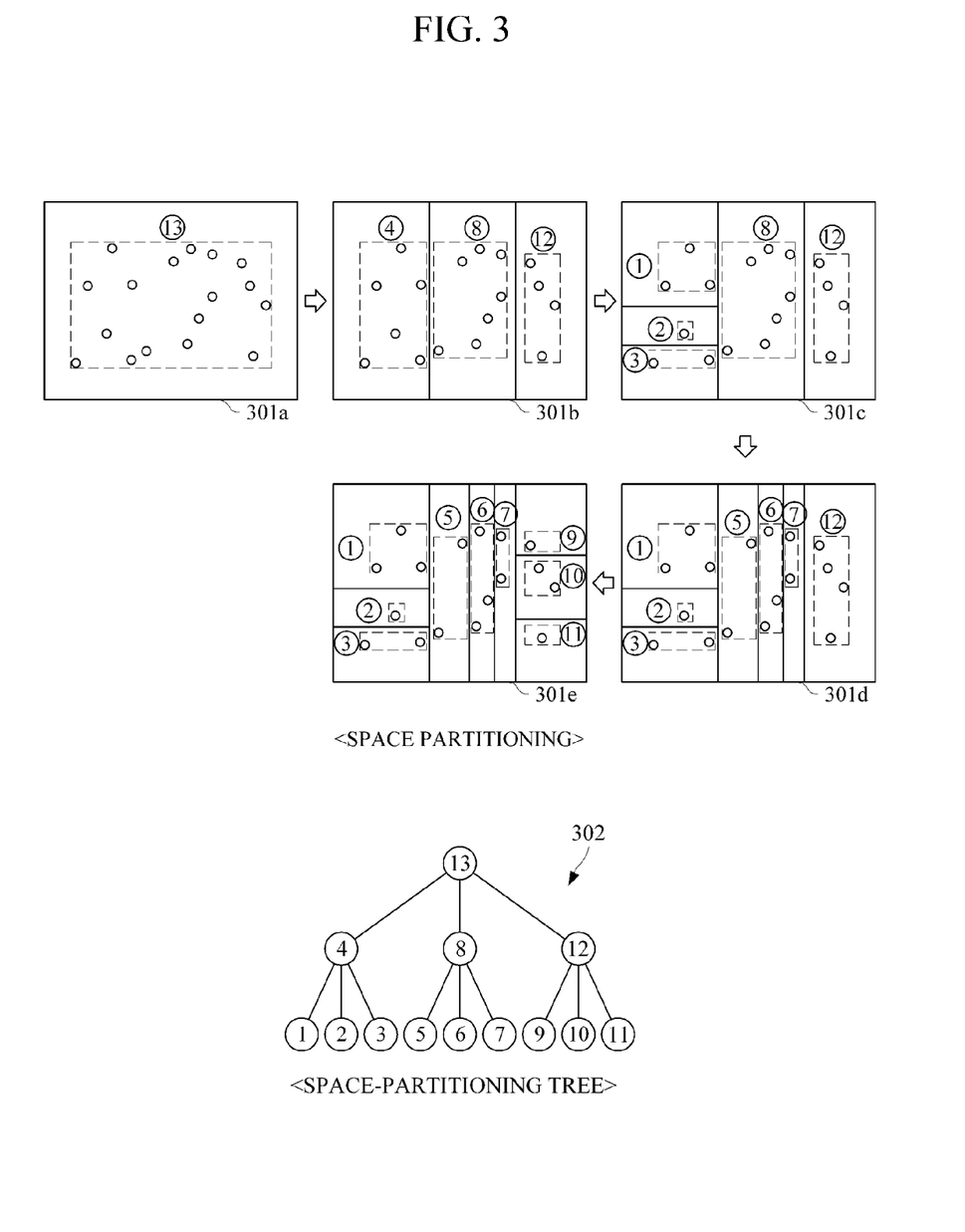
FIG. 3 is a diagram illustrating an example of a space-partitioning tree.

FIG. 3 illustrates an example of a space-partitioning tree.

Referring to FIG. 3, a data space 301a includes a plurality of multidimensional data. In this example, k=3. Accordingly, the data space 301a is partitioned into three sub-spaces, i.e., sub-spaces $\hat{4}$, $\hat{8}$, and $\hat{12}$, by minimum skew k-ary space partitioning, as indicated by reference numeral 301b. The partitioning may be performed so that the sum of skew values of the sub-spaces $\hat{4}$, $\hat{8}$, and $\hat{12}$ is minimized. The sub-spaces $\hat{4}$, $\hat{8}$, and $\hat{12}$ may not necessarily have the same size. Next, the sub-space $\hat{4}$ is partitioned into sub-spaces $\hat{1}$, $\hat{2}$, and $\hat{3}$ by minimum skew k-ary space partitioning, as indicated by reference numeral 301c. The sub-space $\hat{8}$ is partitioned into sub-spaces $\hat{5}$, $\hat{6}$, and $\hat{7}$ by minimum skew k-ary space partitioning, as indicated by reference numeral 301d. The sub-space $\hat{12}$ is partitioned into sub-spaces $\hat{9}$, $\hat{10}$, and $\hat{11}$ by minimum skew k-ary space partitioning, as indicated by reference numeral 301e.

Referring to FIG. 3, each region enclosed by a dotted line is a minimum bounding region. In this example, the minimum bounding region is a minimal region including all data that exists in a corresponding data space or a corresponding sub-space. For example, the data space 301a is represented by a minimum bounding region $\hat{13}$.

In response to the data space 301a being partitioned into a plurality of sub-spaces by minimum skew k-ary space partitioning, the sub-spaces may be mapped to nodes of a space-partitioning tree based on one or more minimum bounding regions of the data space 301a. For example, sub-space $\hat{13}$ is mapped to a root node of a space-partitioning tree 302 as node 13, and the sub-spaces $\hat{4}$, $\hat{8}$, and $\hat{12}$ are mapped to the child nodes of node 13 as nodes 4, 8, and 12, respectively. Each node of the space-partitioning tree 302 may include a set of data that exists in an arbitrary data space or an arbitrary sub-space.

Figure 4:
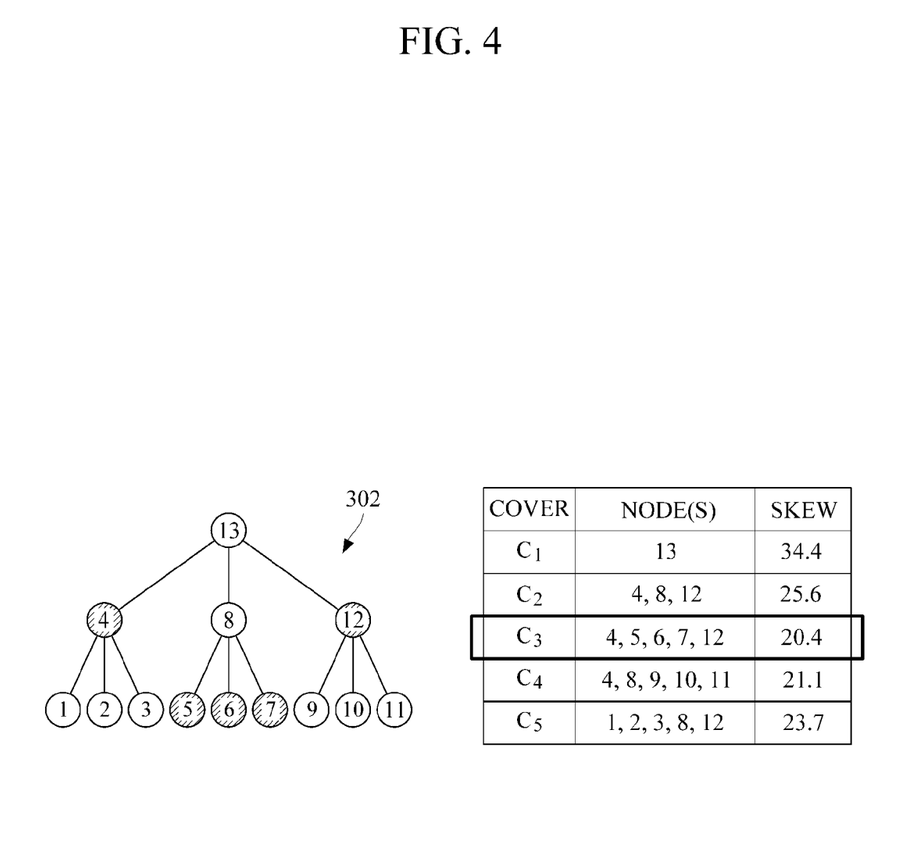
FIG. 4 is a diagram illustrating examples of a cover and a minimal cover.

FIG. 4 illustrates examples of a cover and a minimal cover.

Referring to FIGS. 1 and 4, the minimal cover acquisition unit 102 may extract a particular set of nodes from the space-partitioning tree 302 which satisfies the following cover conditions: 1) the union of terminal child nodes of the set of nodes is the same as the terminal nodes of the space-partitioning tree; and 2) none of the set of nodes are in an ancestor-descendent relationship.

For example, referring to FIG. 4, if the number of buckets is 5, the minimal cover acquisition unit 102 may select five covers, i.e., first, second, third, fourth, and fifth covers $C_1$, $C_2$, $C_3$, $C_4$, and $C_5$. The minimal cover acquisition unit 102 may calculate the skew values of each of the first, second, third, fourth, and fifth covers $C_1$, $C_2$, $C_3$, $C_4$, and $C_5$, and may select one of the first, second, third, fourth, and fifth covers $C_1$, $C_2$, $C_3$, $C_4$, and $C_5$ that satisfies the following minimal cover conditions: 1) the number of nodes that are included in the cover is the same as or is less than the number of buckets in a multidimensional histogram; and 2) the cover has a minimum skew value. In this example, the minimal cover acquisition unit 102 selects a cover that has a minimum skew value, i.e., the third cover $C_3$, as a minimal cover. The skew values of the first, second, third, fourth, and fifth covers $C_1$, $C_2$, $C_3$, $C_4$, and $C_5$ may be calculated based on the size of a data space including one or more nodes of each of the first, second, third, fourth, and fifth covers $C_1$, $C_2$, $C_3$, $C_4$, and $C_5$ and the standard deviation of the frequency of data in the data space, as indicated by Equation (1) in the examples described herein.

Referring to FIGS. 1 and 4, the histogram generation unit 103 may generate a multidimensional histogram by configuring nodes of a minimal cover selected by the minimal cover acquisition unit 102, i.e., nodes 4, 5, 6, 7, and 12, as buckets of the multidimensional histogram.

Figure 5:
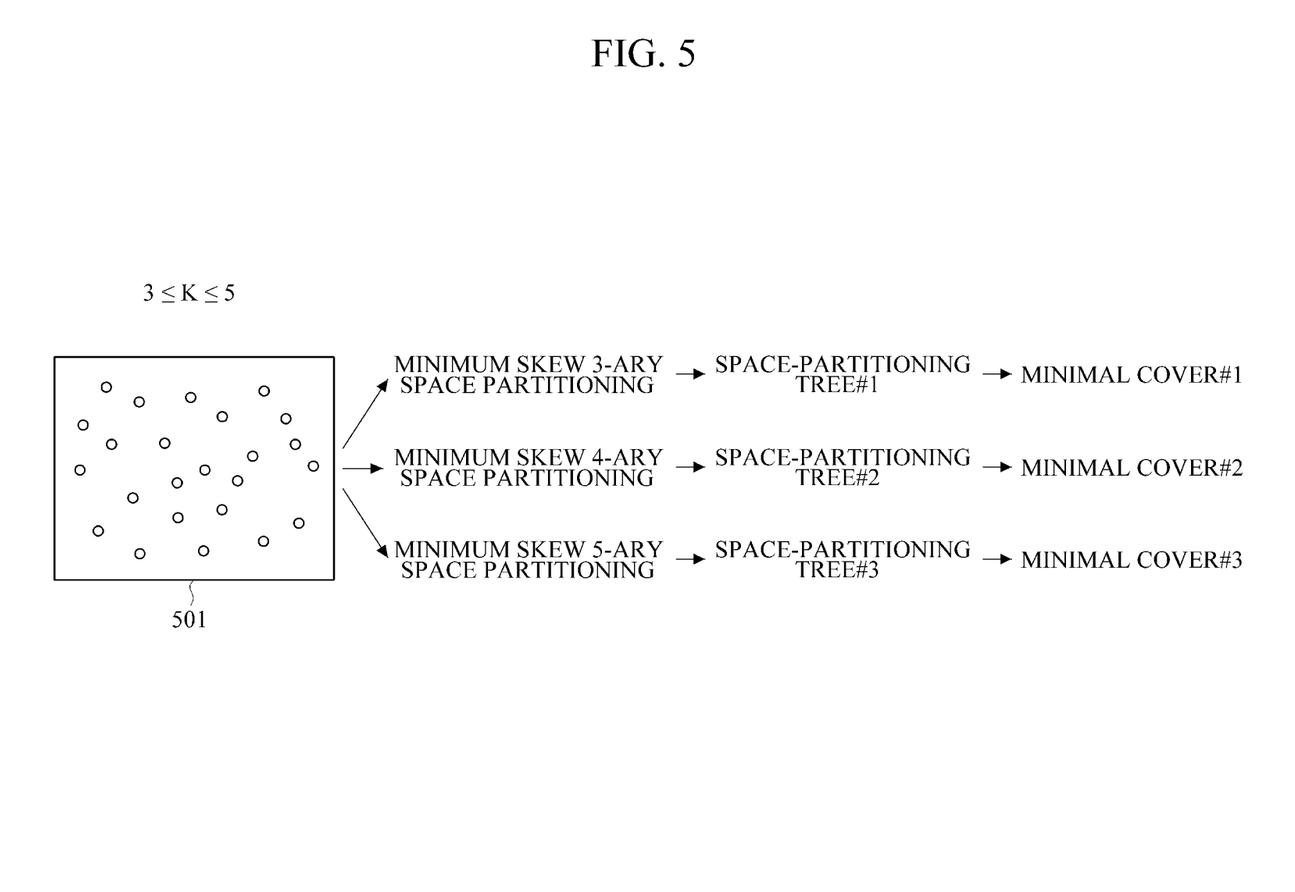
FIG. 5 is a diagram illustrating examples of generating a space-partitioning tree and obtaining a minimal cover.

FIG. 5 illustrates examples of generating a space-partitioning tree and acquiring a minimal cover.

For example, referring to FIG. 2, only one value (for example, k=3) may be given as the value of the integer k as tree generation information. As another example, referring to FIG. 5, a range of integer values (for example, 3≤k≤5) may be given as the value of the integer k as tree generation information. In various example, information on the value of the integer k may be received from a user or may be provided as default information. In a case in which only one integer value is given as the value of the integer k, a space-partitioning tree may be generated for each integer value that is obtained by increasing the value of the integer k from the given integer value over a predefined amount of time.

Referring to FIGS. 1 and 5, the tree generation unit 101 may determine the value of the integer k and the predefined amount of time, and/or may calculate a number v of integer values that may be used as the integer k. The number v of integer values that may be used as the integer k may have an integer value. For example, if k=3 and the predefined amount of time is 2 clocks (or 2 cycles) long, or if 3≤k≤5, the number v of integer values that may be used as the integer k may be 3.

The tree generation unit 101 may perform minimum skew k-ary space partitioning for each integer value that may be used as the integer k. In the example in which 3≤k≤5, the tree generation unit 101 may generate space-partitioning tree #1 by partitioning a data space 501 using minimum skew 3-ary space partitioning, may generate space-partitioning tree #2 by partitioning a data space 501 using minimum skew 4-ary space partitioning, and may generate space-partitioning tree #3 by partitioning a data space 501 using minimum skew 5-ary space partitioning. Examples of minimum skew 3-ary, 4-ary, and 5-ary space partitioning processes and space-partitioning trees that may be obtained by the minimum skew 3-ary, 4-ary, and 5-ary space partitioning processes is described herein with reference to FIG. 2.

The minimal cover acquisition unit 102 may acquire a minimal cover from each of the space-partitioning trees that are generated by the tree generation unit 101. For example, referring to FIG. 5, the minimal cover acquisition unit 102 acquires minimal cover #1 from space-partitioning tree #1, acquires minimal cover #2 from space-partitioning tree #2, and acquires minimal cover #3 from space-partitioning tree #3.

The minimal cover acquisition unit 102 may select a minimal cover that has a smallest skew value from among minimal covers #1, #2, and #3. For convenience, minimal covers #1, #2, and #3 are referred to as candidate minimal covers, and a minimal cover selected from among the candidate minimal covers is referred to as a final minimal cover. For example, if minimal cover #1 has a smallest skew value, the minimal cover acquisition unit 102 may select minimal cover #1 as the final minimal cover.

In response to a final minimal cover being determined, the histogram generation unit 103 may generate a multidimensional histogram that is based on the final minimal cover. For example, referring to FIG. 5, the histogram generation unit 103 may designate one or more minimum bounding regions corresponding to one or more nodes that are included in minimal cover #1, as buckets of a multidimensional histogram.

Figure 6:
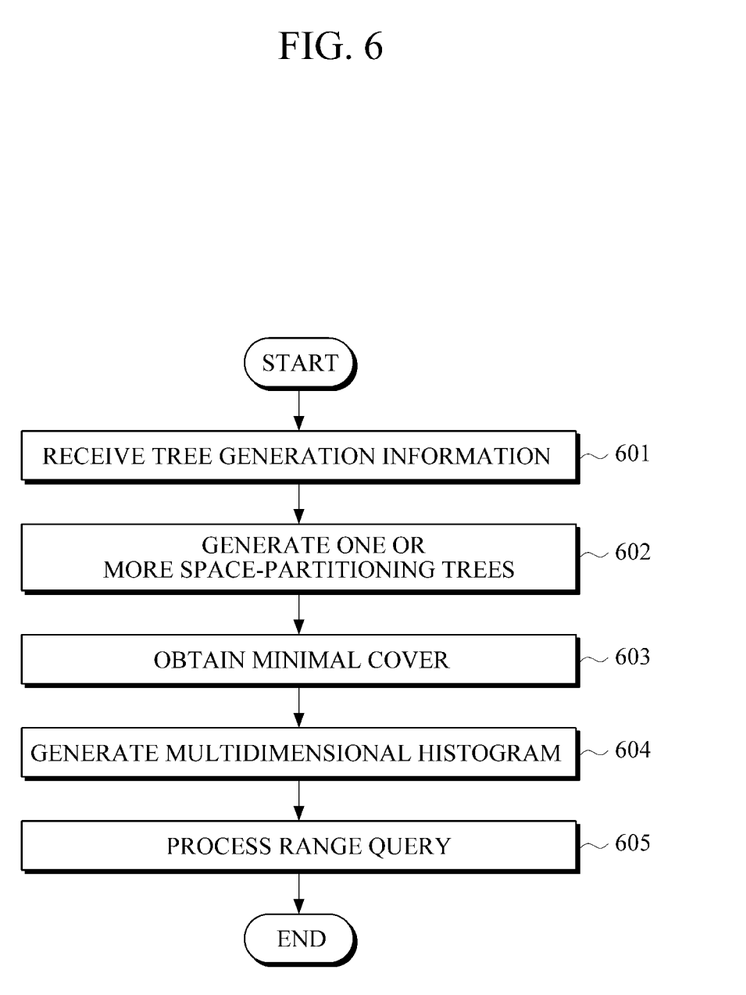
FIG. 6 is a flowchart illustrating an example of a method for calculating the selectivity of a range query for multidimensional data.

FIG. 6 illustrates an example of a method for calculating the selectivity of a range query for multidimensional data.

Referring to FIG. 6, in 601, tree generation information is received. For example, the tree generation information may include an integer value or a range of integer values that may be used as the integer k. In various examples, the tree generation information may include a whole data space, a set of data, a maximum allowed number of buckets, an index structure, and the like.

In 602, one or more space-partitioning trees are generated by performing minimum skew k-ary space partitioning. For example, referring to FIGS. 1, 2, 3, and 5, the tree generation unit 101 may partition a data space, thereby obtaining one or more space-partitioning trees. The expression 'partitioning of a data space' may indicate partitioning data based on a minimum bounding region.

In the example illustrated in FIG. 6, the expression 'partitioning of a data space' may be interpreted as being the same as partitioning data based on a minimum bounding region. For example, if there are v integer values that may be used as the integer k, the tree generation unit 101 may generate v space-partitioning trees.

In 603, a minimal cover is acquired from each of the space-partitioning trees that are generated in 602. For example, referring to FIGS. 1, 4, and 5, the minimal cover acquisition unit 102 may acquire a set of nodes that satisfy the cover conditions and the minimal cover conditions. In this example, if there are v integer values that may be used as the integer k, the minimal cover acquisition unit 102 may acquire v minimal covers, and may select a minimal cover that has a smallest skew value, from among the v minimal covers, as a final minimal cover.

In 604, a multidimensional histogram is generated based on the final minimal cover. For example, the histogram generation unit 103 shown in FIG. 1 may designate one or more nodes that are included in the final minimal cover as buckets of the multidimensional histogram.

In 605, a range query is processed using the multidimensional histogram. For example, the range query processing unit 104 shown in FIG. 1 may process a range query and may return the results of the processing or may return an estimate of the selectivity of the range query.

As described herein, by using minimum skew k-ary space partitioning, it is possible to generate a space-partitioning tree with nodes that have a uniform distribution of data. In addition, it is possible to improve the precision of estimation by generating more than one space-partitioning tree by using a range of integer values that may be used as the integer k, selecting a minimal cover from the space-partitioning trees, and generating a multidimensional histogram based on the selected minimal cover.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for calculating the selectivity of a range query for multidimensional data, the apparatus comprising:
a tree generator configured to partition a data space into one or more sub-spaces based on a sum of skew values of the one or more sub-spaces, and to generate a plurality of space-partitioning trees for the data space;
a minimal cover acquirer configured to acquire a plurality of minimal covers from the plurality of space-partitioning trees, each of the plurality of minimal covers including one or more nodes of a corresponding space-partitioning tree, and to select one of the plurality of minimal covers; and
a histogram generator configured to generate a histogram for the data space based on the selected minimal cover,
wherein the skew value of each sub-space is defined as a multiplication of a size of a corresponding sub-space and a standard deviation of a number of data in the corresponding sub-space.

2. The apparatus of claim 1, wherein the tree generator is further configured to receive an integer value of 3 or greater for an integer k that is tree generation information for generating the space-partitioning tree, and to partition the data space into the one or more sub-spaces using minimum skew k-ary space partitioning to minimize the sum of the skew values of the one or more sub-spaces.

3. The apparatus of claim 2, wherein the tree generator is further configured to perform minimum skew k-ary space partitioning for each integer value that is obtained by sequentially increasing a value of the integer k for a predefined amount of time.

4. The apparatus of claim 1, further comprising:
the minimal cover acquirer is further configured to acquire a set of one or more nodes that satisfy a first set of conditions from the space-partitioning tree, as a cover, and to acquire a set of one or more nodes that satisfy a second set of conditions from the space-partitioning tree, as the minimal cover,
wherein the first set of conditions are 1) the union of terminal child nodes of the set of nodes is the same as the terminal nodes of the space-partitioning tree, and 2) none of the set of nodes are in an ancestor-descendent relationship, and the second set of conditions are 1) the number of nodes that are included in the cover is the same as or less than the number of buckets in a multidimensional histogram, and 2) the cover has a minimum skew value.

5. An apparatus for calculating the selectivity of a range query for multidimensional data, the apparatus comprising:
a tree generator configured to generate a plurality of space-partitioning trees for a data space;
a minimal cover acquirer configured to acquire a plurality of minimal covers from the plurality of space-partitioning trees, each of the plurality of minimal covers including one or more nodes of a corresponding space-partitioning tree, and to select one of the plurality of minimal covers; and a histogram generator configured to generate a histogram for the data space based on the selected minimal cover,
wherein the tree generator is further configured to partition the data space into one or more sub-spaces based on a sum of skew values of the one or more sub-spaces and the skew value of each sub-space is defined as a multiplication of a size of a corresponding sub-space and a standard deviation of a number of data in the corresponding sub-space.

6. The apparatus of claim 5, wherein the tree generator is further configured to receive a predetermined range of integer values for an integer k that is tree generation information for generating the plurality of space-partitioning trees, to partition the data space into one or more sub-spaces using minimum skew k-ary space partitioning by which a sum of skew values of the one or more sub-spaces is minimized, and to generate a space-partitioning for each integer value that is included in the predetermined range of integer values.

7. The apparatus of claim 6, wherein the minimal cover acquirer comprises:
an acquisition module configured to acquire a minimal cover for each integer value that is included in the predetermined range, from the number of space-partitioning trees; and a selection module configured to select a minimal cover that has a smallest skew value from among the minimal covers of each integer value.

8. The apparatus of claim 7, wherein the acquisition module is further configured to acquire a set of one or more nodes that satisfy a first set of conditions from a space-partitioning tree, as a cover, and to acquire a set of one or more nodes that satisfy a second set of conditions from the space-partitioning tree, as a minimal cover, and
the first set of conditions are 1) the union of terminal child nodes of the set of nodes is the same as the terminal nodes of the space-partitioning tree, and 2) none of the set of nodes are in an ancestor-descendent relationship, and the second set of conditions are 1) the number of nodes that are included in the cover is the same as or less than the number of buckets in a multidimensional histogram, and 2) the cover has a minimum skew value.

9. A method of calculating the selectivity of a range query for multidimensional data, the method comprising:
partitioning a data space into one or more sub-spaces based on a sum of skew values of the one or more sub-spaces, and generating a plurality of space-partitioning trees for the data space;
acquiring, at a minimal cover acquirer, a plurality of minimal covers from the plurality of space-partitioning trees, each of the plurality of minimal covers including one or more nodes of a corresponding space-partitioning tree, and selecting one of the plurality of minimal covers; and
generating a histogram for the data space based on the selected minimal cover,
wherein the skew value of each sub-space is defined as a multiplication of a size of a corresponding sub-space and a standard deviation of a number of data in the corresponding sub-space.

10. The method of claim 9, wherein the generating the space-partitioning tree comprises:
receiving an integer value of 3 or greater for an integer k that is tree generation information for generating the space-partitioning tree; and
partitioning the data space into the one or more sub-spaces using minimum skew k-ary space partitioning by which the sum of the skew values of the one or more sub-spaces is minimized.

11. The method of claim 10, wherein the generating the space-partitioning tree further comprises performing minimum skew k-ary space partitioning for each integer value that is obtained by sequentially increasing a value of the integer k for a predefined amount of time.

12. The method of claim 10, further comprising:
acquiring a set of one or more nodes that satisfy a first set of conditions from the space-partitioning tree, as a cover; and
acquiring a set of one or more nodes that satisfy a second set of conditions from the space-partitioning tree, as a the minimal cover,
wherein the first set of conditions are 1) the union of terminal child nodes of the set of nodes is the same as the terminal nodes of the space-partitioning tree, and 2) none of the set of nodes are in an ancestor-descendent relationship, and the second set of conditions are 1) the number of nodes that are included in the cover is the same as or less than the number of buckets in a multidimensional histogram, and 2) the cover has a minimum skew value.

13. A method of calculating the selectivity of a range query for multidimensional data, the method comprising:
generating a plurality of space-partitioning trees for a data space;
acquiring a plurality of minimal covers from the plurality of space-partitioning trees, each of the plurality of minimal covers including one or more nodes of a corresponding space-partitioning tree;
selecting one of the plurality of minimal covers; and
generating a histogram for the data space based on the selected minimal cover,
wherein the generating the plurality of space-partitioning trees comprises partitioning the data space into one or more sub-spaces based on a sum of skew values of the one or more sub-spaces and the skew value of each sub-space is defined as a multiplication of a size of a corresponding sub-space and a standard deviation of a number of data in the corresponding sub-space.

14. The method of claim 13, wherein the generating the plurality of space-partitioning trees comprises:
receiving a predetermined range of integer values for an integer k that is tree generation information for generating the plurality of space-partitioning trees;
partitioning the data space into one or more sub-spaces using minimum skew k-ary space partitioning by which a sum of skew values of the one or more sub-spaces is minimized; and
generating a space-partitioning tree for each integer value that is included in the predetermined range.

15. The method of claim 13, wherein the acquiring of the plurality of minimal covers comprises:
acquiring a minimal cover for each integer value that is included in a predetermined range, from the number of space-partitioning trees; and
selecting a minimal cover that has a smallest skew value from among the minimal covers for each integer value.

16. The method of claim 15, wherein the acquiring of the plurality of minimal covers comprises:
acquiring a set of one or more nodes that satisfy a first set of conditions from a space-partitioning tree, as a cover; and
acquiring a set of one or more nodes that satisfy a second set of conditions from the space-partitioning tree, as a minimal cover,
wherein the first set of conditions are 1) the union of terminal child nodes of the set of nodes is the same as the terminal nodes of the space-partitioning tree, and 2) none of the set of nodes are in an ancestor-descendent relationship, and the second set of conditions are 1) the number of nodes that are included in the cover is the same as or less than the number of buckets in a multidimensional histogram, and 2) the cover has a minimum skew value.

17. A method of calculating the selectivity of a range query for multidimensional data, the method comprising:
   receiving, from a user, an integer value or a range of integer values as a value of an integer k;
   partitioning a multidimensional data space into one or more sub-spaces based on the integer value or the range of integer values using minimum skew k-ary space partitioning by which a sum of skew values of the one or more sub-spaces is minimized, and generating V space-partitioning trees by mapping the one or more sub-spaces to one or more tree nodes, wherein v is equal to the number of integer values received from the user;
   acquiring v minimal covers from the v space-partitioning trees, respectively, and selecting a minimal cover with a smallest skew value from among the v minimal covers, as a final minimal cover; and
   generating a multidimensional histogram based on the final minimal cover.

18. The method of claim 17, wherein, in response to receiving the integer value as the value of the integer k from the user, the generating the v space-partitioning trees comprises performing minimum skew k-ary space partitioning for each integer value that is obtained by sequentially increasing the value of the integer k for a predefined amount of time.

* * * * *